(12) United States Patent
Ahmadi

(10) Patent No.: US 10,477,517 B2
(45) Date of Patent: *Nov. 12, 2019

(54) METHODS AND APPARATUS FOR OPPORTUNISTIC RADIO RESOURCE ALLOCATION IN MULTI-CARRIER COMMUNICATION SYSTEMS

(71) Applicant: APPLE INC., Cupertino, CA (US)

(72) Inventor: Sassan Ahmadi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/447,997

(22) Filed: Mar. 2, 2017

(65) Prior Publication Data
US 2017/0181131 A1    Jun. 22, 2017

Related U.S. Application Data

(63) Continuation of application No. 13/627,942, filed on Sep. 26, 2012, now Pat. No. 9,603,124.
(Continued)

(51) Int. Cl.
*H04W 72/04* (2009.01)
*H04W 16/14* (2009.01)
*H04L 5/14* (2006.01)

(52) U.S. Cl.
CPC ........... *H04W 72/04* (2013.01); *H04W 16/14* (2013.01); *H04L 5/14* (2013.01)

(58) Field of Classification Search
None
See application file for complete search history.

(56) References Cited

U.S. PATENT DOCUMENTS 8,326,227 B2    12/2012  Zhou et al.
8,780,828 B2     7/2014  Ghosh et al.
(Continued)

FOREIGN PATENT DOCUMENTS

CN         1729707        2/2006
CN       102007709        4/2011
(Continued)

OTHER PUBLICATIONS

ETSI TR 102 907, Reconfigurable Radio Systems (RRS); Use Cases for Operation in White Space Frequency Bands, V1.1.1, Oct. 2011. [online], Internet <URL:http://www.etsi.org/deliber/etsi_tr/102900_102999/102999/01.01.01_60/tr_1029007v010101p.pdf>.

*Primary Examiner* — Phong La
(74) *Attorney, Agent, or Firm* — Fay Kaplun & Marcin, LLP

(57) ABSTRACT

Methods and apparatus for dynamic sharing of resources such as radio frequency (RF) spectrum in a wireless system. In one embodiment, the sharing is conducted among a number of base stations (e.g., eNodeBs or Access Points (APs)), or among different radio access technologies (RATs). In one implementation, the sharing is accomplished through reservation of new RF carriers, and temporary assignment (and release) of one or more RF carriers to the multi-carrier enabled radio access systems or base stations. Such dynamic spectrum sharing allows opportunistic use of additional RF carriers in a multi-carrier system as opposed to permanent availability to the eNodeB or AP regardless of their effective usage.

14 Claims, 10 Drawing Sheets

Related U.S. Application Data

(60) Provisional application No. 61/637,758, filed on Apr. 24, 2012.

(56) References Cited

U.S. PATENT DOCUMENTS

| | | | | |
|---|---|---|---|---|
| 2006/0083205 A1* | 4/2006 | Buddhikot | H04W 16/14 | 370/338 |
| 2006/0160543 A1* | 7/2006 | Mashinsky | H04W 16/10 | 455/452.2 |
| 2008/0108365 A1* | 5/2008 | Buddhikot | H04W 16/10 | 455/452.1 |
| 2008/0242301 A1* | 10/2008 | Osterling | H04W 36/08 | 455/436 |
| 2009/0059785 A1* | 3/2009 | Jogalekar | H04L 47/10 | 370/230 |
| 2009/0318124 A1* | 12/2009 | Haughn | G06F 8/65 | 455/418 |
| 2010/0110886 A1 | 5/2010 | Sorri et al. | | |
| 2010/0248764 A1* | 9/2010 | Callaway, Jr. | H04L 5/0058 | 455/509 |
| 2011/0055070 A1* | 3/2011 | Stanforth | G06Q 10/063 | 705/37 |
| 2011/0096770 A1* | 4/2011 | Henry | G04W 16/14 | 370/352 |
| 2011/0205941 A1* | 8/2011 | Stanforth | H04W 16/14 | 370/280 |
| 2011/0280194 A1* | 11/2011 | Schmidt | H04W 72/02 | 370/329 |
| 2012/0082100 A1* | 4/2012 | Ahmadi | H04W 72/1215 | 370/329 |
| 2012/0094681 A1 | 4/2012 | Freda et al. | | |
| 2012/0099558 A1* | 4/2012 | Skov | G04W 16/12 | 370/329 |
| 2012/0140799 A1* | 6/2012 | Lim | H04L 27/0006 | 375/219 |
| 2012/0218954 A1* | 8/2012 | Barbieri | H04L 5/003 | 370/329 |
| 2012/0294168 A1* | 11/2012 | Freda | H04B 1/0067 | 370/252 |
| 2012/0307744 A1* | 12/2012 | Charbit | H04W 72/1205 | 370/329 |
| 2013/0128823 A1* | 5/2013 | Turtinen | H04L 5/0037 | 370/329 |
| 2013/0165134 A1* | 6/2013 | Touag | H04W 72/0486 | 455/452.1 |
| 2013/0195073 A1* | 8/2013 | Chen | H04L 5/0023 | 370/331 |
| 2013/0322279 A1* | 12/2013 | Chincholi | H04W 24/10 | 370/252 |
| 2013/0337821 A1* | 12/2013 | Clegg | H04L 5/0062 | 455/452.1 |
| 2014/0051469 A1* | 2/2014 | Kasslin | H04L 1/00 | 455/509 |
| 2014/0140314 A1* | 5/2014 | Wei | H04W 48/12 | 370/329 |
| 2014/0204791 A1* | 7/2014 | Teng | H04W 16/14 | 370/252 |
| 2014/0241265 A1* | 8/2014 | Pragada | H04W 72/06 | 370/329 |
| 2015/0131536 A1* | 5/2015 | Kaur | H04L 5/001 | 370/329 |
| 2015/0223241 A1* | 8/2015 | Cattoni | H04L 5/0044 | 370/329 |

FOREIGN PATENT DOCUMENTS

| | | |
|---|---|---|
| CN | 102197672 | 9/2011 |
| JP | 2012-504360 | 2/2012 |
| WO | 2004/057505 | 7/2004 |
| WO | 2011/041758 | 4/2011 |
| WO | 2011/148798 | 12/2011 |
| WO | 2012/002576 | 1/2012 |

* cited by examiner

METHODS AND APPARATUS FOR OPPORTUNISTIC RADIO RESOURCE ALLOCATION IN MULTI-CARRIER COMMUNICATION SYSTEMS

PRIORITY

This application claims priority to U.S. Provisional Patent Application Ser. No. 61/637,758 of the same title filed Apr. 24, 2012, which is incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of communications technology. More particularly, in one exemplary aspect, the present invention is directed to dynamically sharing spectrum among a number of diverse wireless technologies or network operators according to, e.g., a reservation-based scheme.

2. Description of Related Technology

With consumers' increased use of wireless technology in recent years, radio frequency spectrum has emerged as a critical resource. This is especially true of so-called "licensed" spectrum, which is allocated on an exclusive basis (as compared to unlicensed portions of the spectrum, which can be accessed by literally anyone).

Cellular systems often use licensed spectrum which are operator exclusively-owned, scarce and very expensive. Thus, efficient use of licensed spectral resources is crucial to network operators' short-term and long-term profitability and continued business, in terms of mobile customer satisfaction of the quality and quantity of the services provided.

Recent studies of wireless technology (such as for example that utilized in cellular networks operating within the aforementioned licensed spectrum) suggest that spectral resources are often not efficiently utilized by operators of such networks. For instance, if a spectral resource is idle or unused, another network provider/operator is not allowed to use the spectral resource. In fact, when spectral resources are monitored dynamically as a function of time and location or a combination of both, there are many unused spectrum opportunities. These opportunities typically require more sophisticated spectrum management and allocation techniques in order to be efficiently utilized.

Existing solutions within the prior art do not provide for optimized spectral usage, including specifically efficient coordination among wireless technologies for dynamically "sharing" spectrum.

Accordingly, there is a salient need for improved methods and apparatus which provide such spectral sharing and coordination capabilities.

SUMMARY OF THE INVENTION

The present invention satisfies the foregoing needs by providing, inter alia, improved apparatus and methods for dynamically sharing spectrum, such as among a number of diverse wireless technologies, or even two or more network operators.

In one exemplary aspect, a reservation-based scheme is used as part of the foregoing apparatus and methods, wherein base stations or other entities in the network requiring resources request the needed resources from a substantially centralized management entity.

In another aspect of the invention a dynamic radio frequency resource sharing method is disclosed. In one embodiment, the method includes: receiving at a network entity request from a base station for a radio frequency resource (e.g., RF spectrum); identifying at least one unused radio frequency resource; and allocating the identified at least one resource for use by the base station. Any radio frequency resource within the available radio frequency spectrum is eligible for such allocation (and subsequent de-allocation).

In one variant, identification of unused resources is performed at least in part using one or more cognitively sensed parameters such as spectral energy.

In another aspect of the invention, a dynamic radio frequency resource sharing architecture is disclosed. In one embodiment, the architecture includes: a spectrum management entity; and a dynamic spectrum sharing entity in communication with the management entity. The spectrum management entity and spectrum sharing entity cooperate to identify unused radio frequency spectrum, and allocate the identified unused spectrum to either (i) at least one of a plurality of base stations; or (ii) at least one of a plurality of radio access technologies.

In a further aspect of the invention, a resource management entity for use in a wireless system is disclosed. In one embodiment, the management entity is disposed at the core of the network, and communicates with a plurality of base stations, the latter having dynamic resource sharing entities which request allocations of resources from the resource management entity, and receive allocations of identified unused resources. In one variant, the management entity is an intra-network entity. In another variant, the management entity is a cross- or inter-network entity that coordinates between two or more distinct networks.

In yet another aspect of the invention, a dynamic resource sharing entity for use in a wireless system is disclosed. In one embodiment, the sharing entity is disposed at one or more base stations or access points of the network, and communicates with the aforementioned management entity (or multiple management entities). The sharing entity has in one implementation dynamic resource sharing capabilities, and can request allocations of resources from the resource management entity, and receive allocations of identified unused resources and cause these resources to be utilized by the appropriate base stations and user devices. In one such variant, the resources are spectral resources.

In a further aspect of the invention, a computer readable apparatus is disclosed. In one embodiment, the apparatus has a storage medium with at least one computer program disposed thereon and which is configured to, when executed, implement unused resource (e.g., spectrum) identification and allocation procedures, such as for the aforementioned resource management entity. In another embodiment, the at least one program is operative to issue resource requests and receive allocations, and cause utilization of the allocated resources by, e.g., a host base station (e.g., eNodeB). In one such variant, the resources are spectral resources.

In another aspect of the invention, methods and apparatus for determination of unused RF spectrum are disclosed. In one embodiment, the methods and apparatus utilize sensing of portions of the RF spectrum to determine energy emitted therein, and comparison of the detected energy levels to a prescribed threshold to deter mine whether a white space exists in that portion.

In still another aspect of the invention, a wireless user device is disclosed. In one embodiment, the user device (e.g., UE) is configured with software-defined radio (SDR) capabilities to allow reconfiguration of its transmits/receive chains so as to utilize previously unused resources such as radio frequency spectrum, as dictated by a base station/ dynamic sharing entity. In one variant, the user device further includes one or more cognitive radio functions which permit, inter alia, the user device to sample or monitor its radio frequency environment for e.g., unused spectrum or "white spaces", and to report such information to the sharing entity (or indirectly to the core management entity). Other features and advantages of the present invention will immediately be recognized by persons of ordinary skill in the art with reference to the attached drawings and detailed description of exemplary embodiments as given below.

Figure 1:
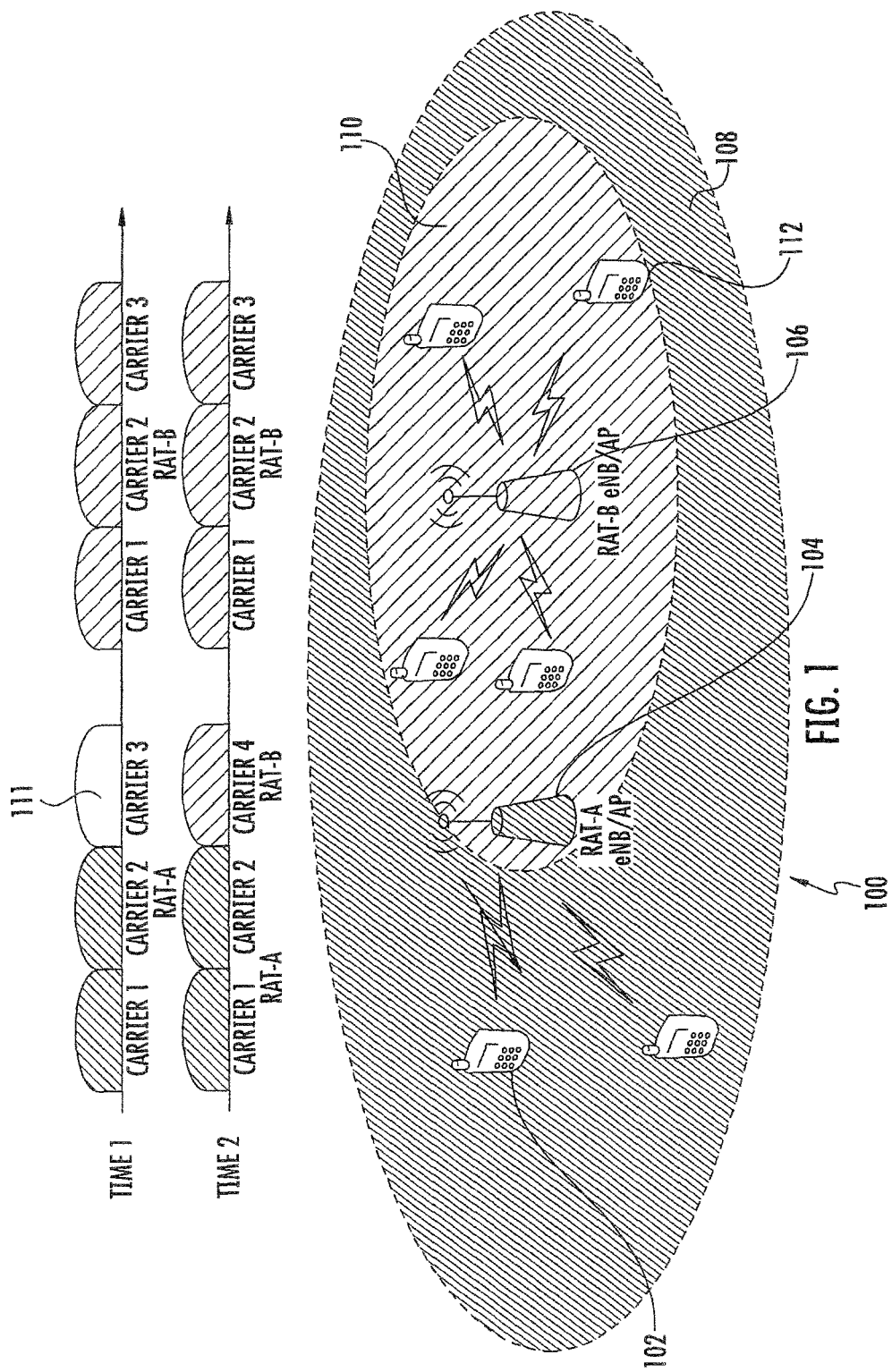
FIG. 1 is a graphical representation of a first typical spectral sharing scenario (multi-RAT, single network operator) with which the present invention may be used.

All Figures © Copyright 2012 Apple Inc. All rights reserved.

DETAILED DESCRIPTION OF THE INVENTION

Reference is now made to the drawings, wherein like numerals refer to like parts throughout.

Overview

In one salient aspect, the present invention discloses an efficient mechanism for detection, assignment and management of available spectrum for use in, inter alia, wireless communications systems such as cellular networks. In one embodiment, cognitive radio schemes and dynamic spectrum sharing through extension of the existing carrier aggregation principles are leveraged, which results in more efficient utilization of the valuable limited radio frequency spectrum available, and which also provides higher data rates and user throughputs. Advantageously, embodiments of the present invention make use of all available RF spectrum (i.e., all carriers used in a multi-carrier scheme may be permanently available to base stations (e.g., eNodeBs) or wireless access points regardless of their effective usage).

In one particular implementation of the invention, the foregoing techniques are particularly adapted for use in a 3GPP Long Term Evolution (e.g., Release 12 (Rel-12) and beyond) system. Specifically, a Spectrum Management Entity (SME) and DSS Measurement, Control and Signaling (DSS MCS) process are utilized within the evolved packet core (EPC) and eNodeB (base station) of the aforementioned system to perform dynamic resource identification, allocation, and termination functions.

Detailed Description of Exemplary Embodiments

Exemplary embodiments of the present invention are now described in detail. While these embodiments are primarily discussed in the context of heterogeneous cellular network operation (such as that employing 3GPP HSPA/LTE (or LTE-A) or TDD/FDD technology), the present invention is in no way so limited. The present invention may for example be implemented to efficiently perform other types of spectral or time-frequency resource sharing and allocation in other types/technologies of cellular networks, or in other types of wireless networks such as WLANs (e.g., Wi-Fi) or WMANs (e.g., WiMAX).

Moreover, while described primarily in the context of radio frequency spectrum allocation, the invention may be applied to identification, allocation, and management of other types of network resources such as e.g., time slots, spreading codes, resource blocks (RB), localized and distributed memory and processing functions in cloud computing and processing networks. Additionally, the methods and apparatus described herein may be utilized on an application basis, such as where unused spectrum identification and allocation are performed only for certain types of traffic or higher-layer applications.

Heterogeneous Networks, Software Defined Radio, and Resource Sharing—

Wireless networks, and especially cellular networks, will increasingly consist of heterogeneous architectures and functionality. So-called "Dynamic Spectrum Access" (DSA) provides a promising solution to address the above-described problem of spectrum underutilization. DSA-based solutions can advantageously be centralized, distributed or a combination of both.

Historically, the IMT-Advanced systems targeted peak data rates in the order of 1 Gbps for low mobility applications, and 100 Mbps for high mobility applications. In order to achieve over-the-air data rates of that order, and in addition to the use of advanced multi-antenna techniques such as MIMO, 3GPP LTE-Advanced (LTE-A) systems utilized carrier aggregation schemes, where two or more component carriers corresponding to a single frequency band, or different frequency bands could be aggregated to create "virtually" wider bandwidths. The peak data rates achievable, as well as the system capacity, can be increased as a result of wider band operation.

The issue of spectrum sharing; i.e., fair sharing or allocation/scheduling of spectral resources, such as spectrum "white spaces" (unused time/frequency resources), combined with cognitive and software-defined radio (SDR) techniques, have been of significant interest to the network operators, and are expected to experience significant utilization in systems beyond IMT-Advanced (i.e., 3GPP LTE Rel-12 and beyond). A Cognitive Radio System (CRS) is a radio system employing technology that allows the system to obtain knowledge (for example, of its operational and geographical environment and parameters, established policies and its internal state) in order to permit, inter alia, dynamic and autonomous adjustment of its operational parameters and protocols according to the obtained knowledge. The term "software defined radio (SDR)" refers generally and without limitation to radio transmitters and/or receivers employing a technology that allows the RF and baseband attributes including, but not limited to, RF center frequency, RF bandwidth, modulation type, or output power, to be set or altered by software. Such alteration generally excludes changes to operating parameters which occur during the normal pre-installed and predetermined operation of a radio according to a system specification or a standard.

The successful realization of dynamic spectrum sharing schemes depends largely on the elimination of a number of technical, economic and regulatory obstacles. The requirements for cellular systems that utilize spectrum sharing capability include for example: (i) architectural design requirements, (ii) techniques to effectively identify reuse opportunities (spectrum sensing), (iii) efficient exploitation of detected opportunities through adaptive transmission and modulation waveforms, (iv) re-configurability, (v) the release of the resource once communication has ended (spectrum mobility), and (vi) interference mitigation mechanisms. Successful implementations of spectrum sharing networks involve specifically-developed or adapted "protocols" and "policies". The goal of such spectrum sharing protocols is usually multi-dimensional in nature. These protocols and policies ideally should ensure efficient and fair use of the spectrum in a stable manner (e.g., by allowing secondary users into the aforementioned "white spaces"), while at the same time minimizing harmful interference to the licensed primary users of the spectrum.

FIG. 1 illustrates an example of dynamic spectrum sharing (DSS) in Multi-Radio Access Technologies (Multi-RAT) operated by a single operator. The Multi-RAT system 100 depicted in FIG. 1 generally includes a plurality of user devices 102, 112 (e.g., cellular phones or smart phones, as described subsequently herein), at least one base station for each RAT 104, 106, and respective coverage areas 108, 110 for the two RATs. Although shown as separate devices, the user devices 102, 112 in this example are hybridized (i.e., able to operate in either RAT).

Figure 2:
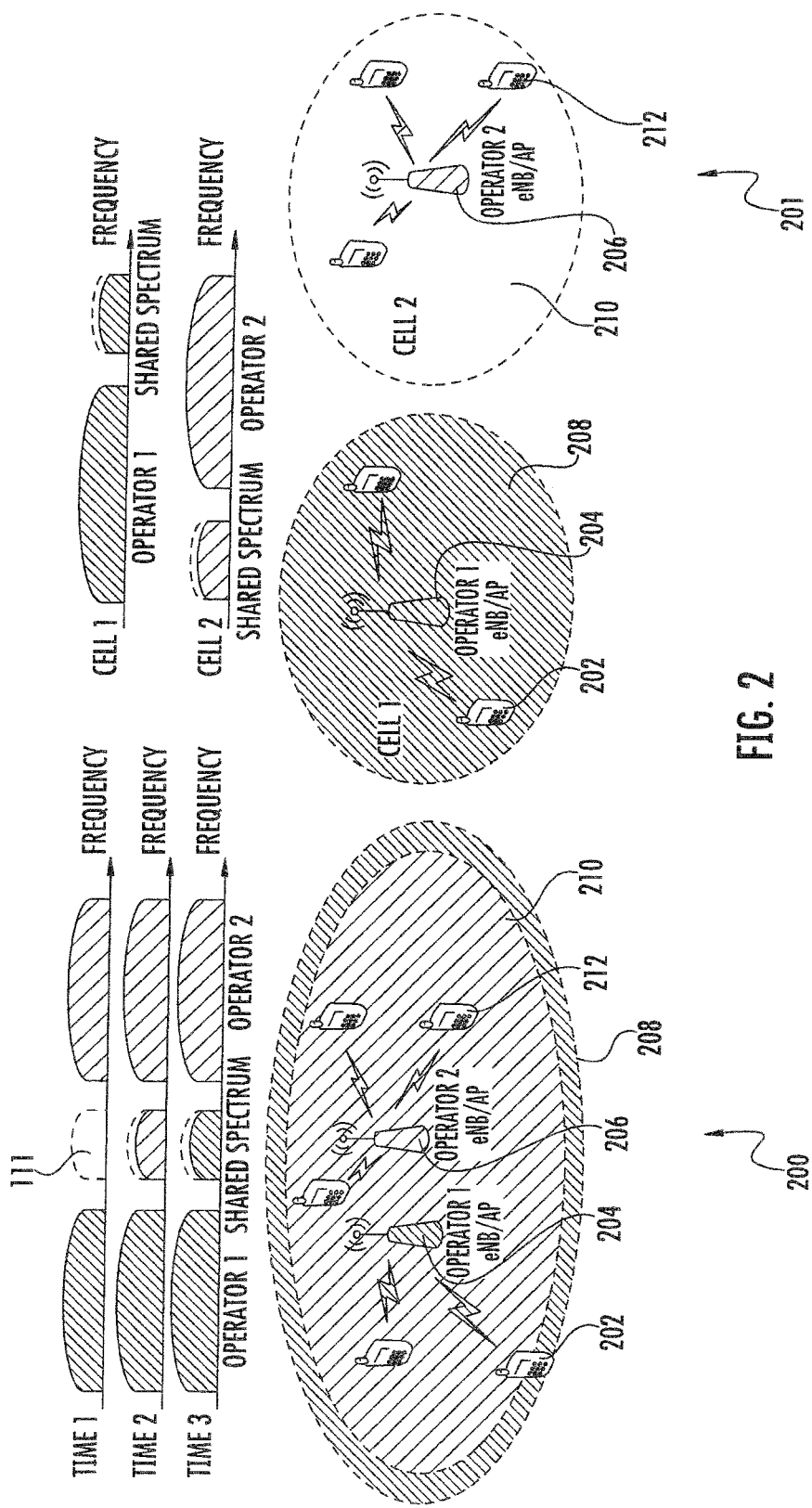
FIG. 2 is a graphical representation of a second typical spectral sharing scenario (multi-RAT, multiple network operator) with which the present invention may be used.

FIG. 2 illustrates an example of dynamic spectrum sharing in Multi-Radio Access Technologies (Multi-RAT) operated by two (2) operators (Operators 1 and 2 in the Figure). Two different scenarios 200, 201 are illustrated; i.e., (i) substantially co-extensive coverage area 208, 210 for each RAT (scenario 200), and (ii) geographically separated coverage areas 208, 210 for the two RATs (scenario 201). As with the system 100 of FIG. 1, each of the two heterogeneous RATS each include user devices 202, 212 and one or more base stations 204, 206.

As shown in FIGS. 1 and 2, and depending on the frequency band, the coverage and cell-size of the different RATs may be similar or different. However, as illustrated, the temporarily unused frequency resources (white spaces 111, 211 at top of each Figure) can be used either by another radio access technology or another operator. In both cases, the spectrum utilization efficiency will advantageously increase. Moreover, it is further appreciated that while various embodiments of the present invention are shown in reference to multi-RAT use scenarios, aspects of the present invention are broadly applicable to both multi-RAT and single-RAT use scenarios.

Figure 3:
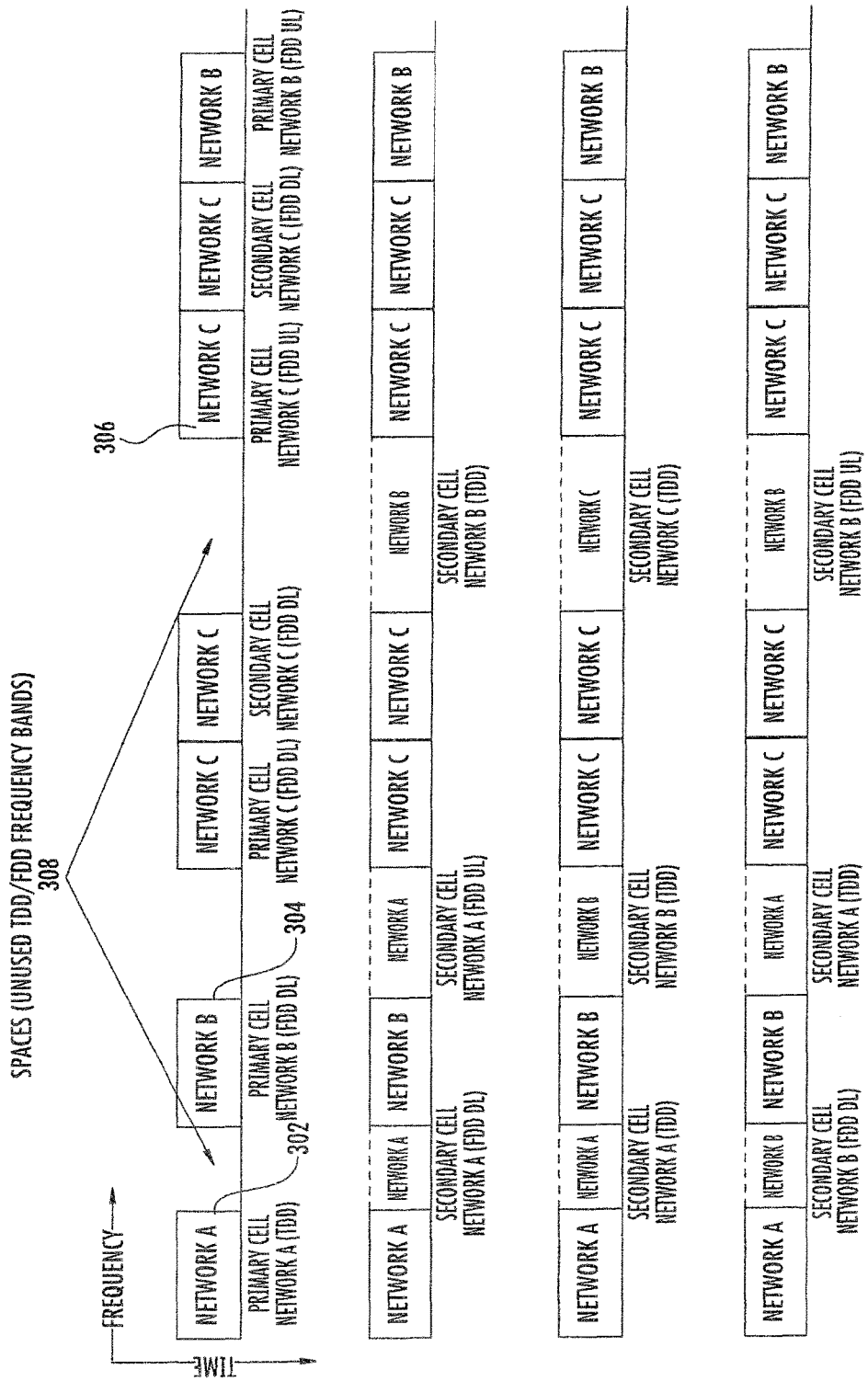
FIG. 3 is a graphical representation of dynamic use of "white spaces" (unused RF bands) by different networks as a function of time.

Assuming that the potentially available spectral bands can be divided into permanently assigned bands and on-demand assigned bands (as shown in FIG. 3 herein), the permanently assigned bands can be used to deploy the same or different radio access technology (such as e.g., 3GPP HSPA/LTE, TDD/FDD duplex schemes, or any of the revisions and/or evolved versions of these technologies). These technologies are referred to as "Network A" 302, "Network B" 304, "Network C" 306, etc. in FIG. 3. In the Figure, three (3) hypothetical networks are shown, each having some permanently assigned adjacent or non-adjacent frequency bands that are used to deploy e.g., TDD or FDD radio access systems. There are some spaces 308 that are shared among the networks over time via dynamic assignment. As a result, there are virtually no spectrum holes or vacancies at any time. The RF carriers associated with the center of the bands assigned to the aforementioned systems are assumed to be fully-configured primary RF carriers that are used for normal operation of the systems, including for example network entry/re-entry by the mobile stations, user data and control signaling transmission in the downlink or uplink, transmission of synchronization and system configuration information, etc. If one permanent RF carrier is assigned to a system, then that RF carrier is designated as the primary carrier, and is fully configured. Any additional permanent RF carrier may be assigned as a secondary RF carrier, and may be fully or partially configured. The temporarily assigned RF carriers are always designated as secondary RF carriers, and may be fully or partially configured.

Methods—

Figure 4:
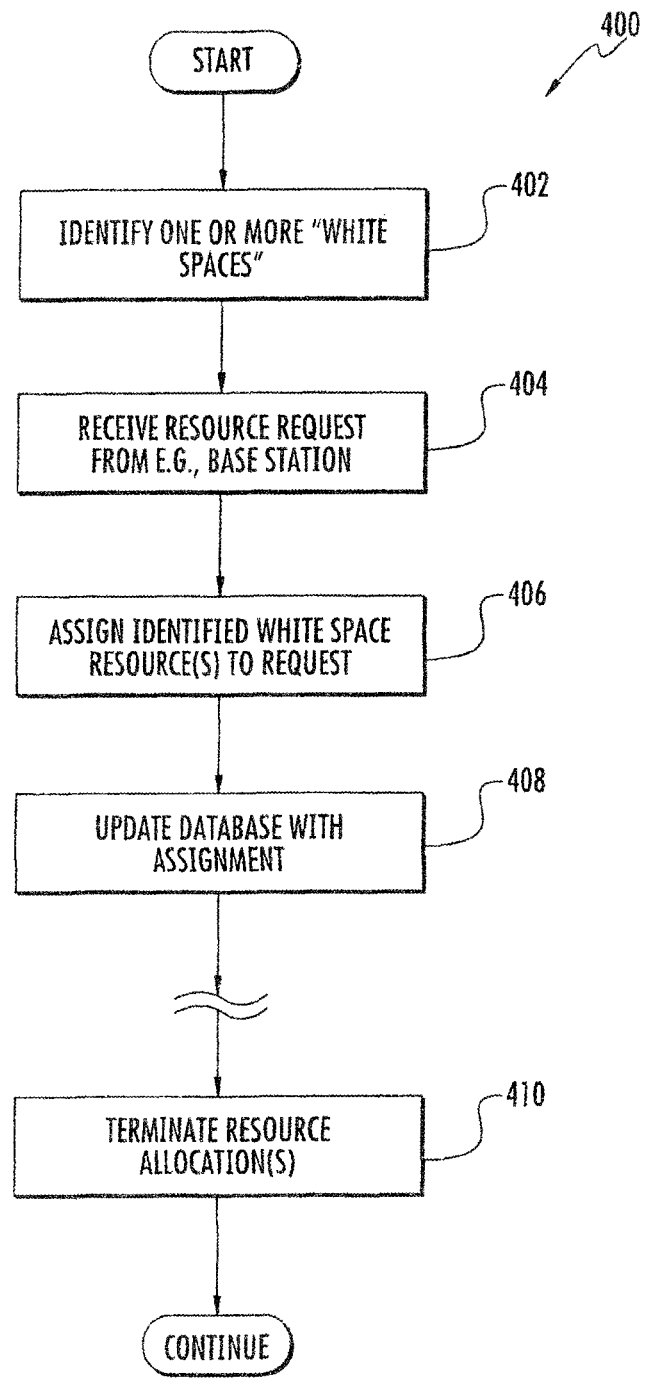
FIG. 4 is a logical flow diagram illustrating one embodiment of a generalized method of unused spectrum identification and allocation according to the invention.

Referring now to FIG. 4, one embodiment of a generalized method 400 for dynamically sharing spectrum among a number of diverse wireless technologies is illustrated. In this embodiment, a reservation-based scheme is utilized as the basis of the dynamic spectral sharing; however, it will be appreciated that out scheme or approaches may be used consistent with the invention. For example, in one variant, requests for reservations are obviated in favor of a "round robin" or similar fairness-based or prioritization-based radio resource allocation algorithm.

In one exemplary implementation, the logic used to implement the method 400 of FIG. 4 is embodied within a network entity, hereinafter referred to as the Spectrum Management Entity (SME), or more broadly, resource management entity (RME). As used herein, the term "spectrum management" refers without limitation to functions including obtaining optimal available spectrum to meet user communication requirements and channel or mobility conditions.

In one implementation of the invention, the SME is a component of the operator's core network, or part of the radio access network (RAN). However, it will be appreciated that the SME functionality may be disposed at literally any location within the network, and may in fact be distributed across multiple components (including user devices 102, 112, 202, 212).

Returning to FIG. 4, at step 402 of the method 400, the permissible unused spectrum is determined. In one exemplary embodiment, an SME detects the permissible unused spectrum via access to a regional or national "white space" database. Alternatively (or in conjunction with the database), cognitive radio techniques may be used to determine information regarding spectral usage (including white spaces). For instance, in one variant, sensing of the radio frequency spectrum for the level of energy present in one or more bands of interest can be used (see discussion of FIGS. 8 and 9, infra). Alternatively (or in conjunction with the foregoing), the absence of certain types of signals can be used to identify white spaces; e.g., by a lack of any identifiable patterns, signaling, or other activity in a portion of the spectrum for a prescribed period of time.

Next, one or more requests for reservation of resources are received (from e.g., base stations within the heterogeneous system) per step 404.

At step 406 of the method 400, responsive to requests for reservation of one or more resources, the requested one or more resources are dynamically assigned. In one such embodiment, the request for reservation includes an indication of one or more unused resources. For example, a base station which can monitor spectral use may be able to identify one or more unused resources. Alternately, the request for resources may completely managed and assigned by the SME without requiring further information from the base station (i.e., the base station does not provide any indication of available or unavailable resources to the SME).

In one embodiment, the SME dynamically assigns available spectrum to one or more base stations that request reservation of the new bands. Such assignment can be used to achieve any number of different operational (or business/operator-related) goals, including without limitation: (i) to balance load, (ii) increase data rates and throughput, and (iii) temporarily increase the number of active users.

At step 408 of the method 400, a database or other information repository is updated according to the dynamic assignment of the one or more resources per step 406. In one exemplary embodiment, the SME maintains and updates a local database to keep track of assigned and released frequency bands. Distributed databases (e.g., those associated with multiple network operators/geographic regions, etc.) may also be maintained/updated as needed.

At step 410 of the method 400, after a period of time and responsive to e.g., notification of termination of use of the one or more resources of the permissible unused spectrum, the one or more resource allocations are terminated. Termination of a given allocation may also be made dependent on other factors or events (as opposed to an affirmative notification), such as the SME observing a power-down or other resource usage-related event on equipment associated with the allocation (e.g., bases station, UE, etc.).

Exemplary SME Apparatus—

Figure 5:
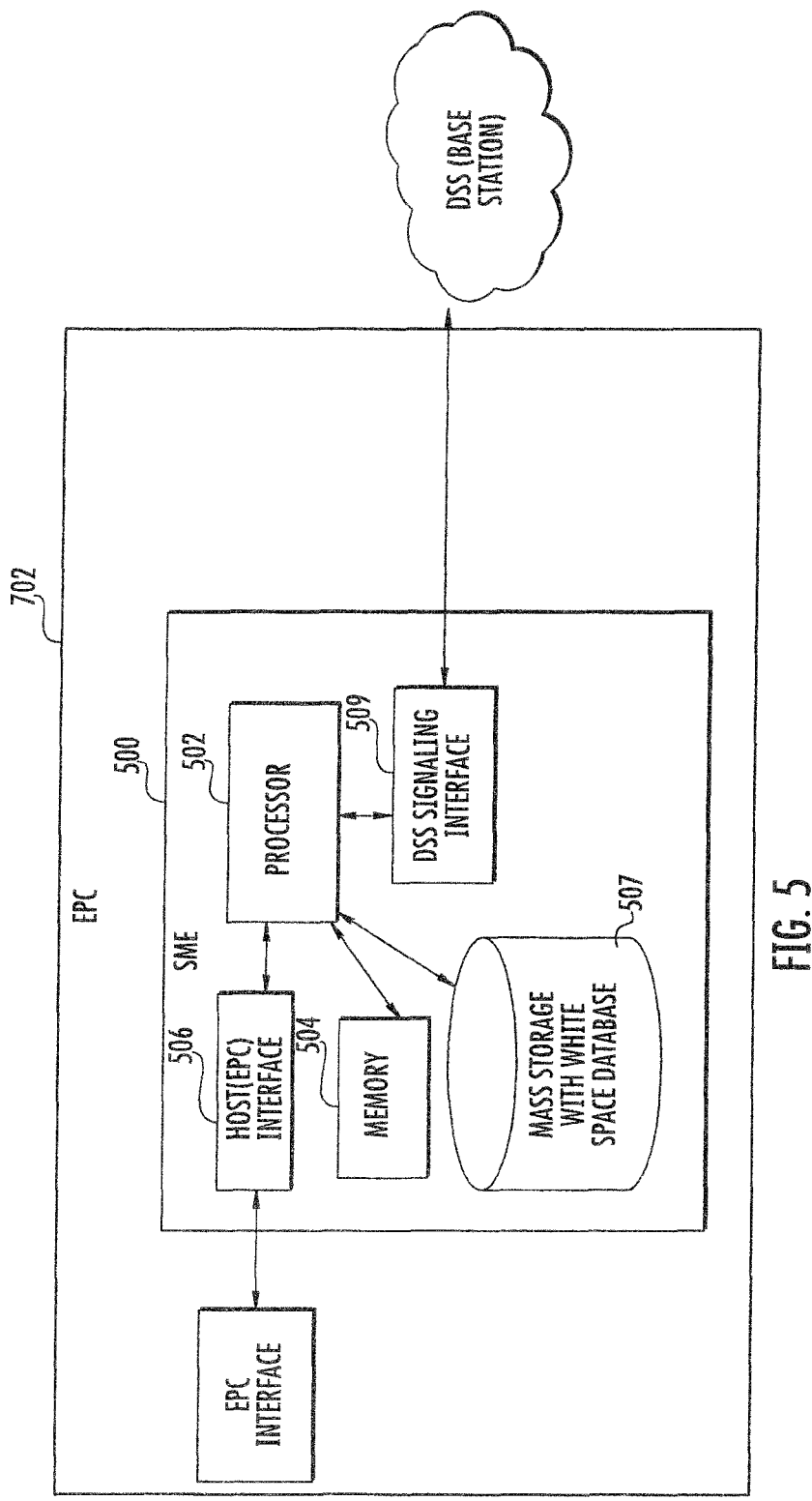
FIG. 5 is a functional block diagram of one embodiment of an exemplary Spectrum Management Entity (SME) apparatus according to the invention.

Referring now to FIG. 5, an exemplary implementation of the SME described above with respect to FIG. 4 is shown and described. In this embodiment, the SME is implemented on a core network (e.g., evolved packet core or EPC) server or other apparatus 702 (see discussion of FIG. 7 below) that is configured to perform identification of white spaces or other unused resources, and dynamically share such resources within an environment including other diverse wireless technologies (e.g., according to the reservation-based scheme described above). As used herein, the term "server" may include any sort of computerized device and can be implemented as a stand-alone entity, or within another extant device or entity.

While a specific device hardware configuration and layout is shown and discussed, it is recognized that many other configurations may be readily implemented by one of ordinary skill given the present disclosure, the SME apparatus 500 of FIG. 5 being merely illustrative of the broader principles of the invention. For example, it is appreciated that the apparatus 500 may take on a server blade or card-like form factor, such as one configured to interface with host EPC processing apparatus.

Alternatively, the SME functionality may be fully integrated with the extant EPC or other entity processing and storage apparatus. Myriad other configurations are possible consistent with the present invention.

The processing subsystem 502 of the apparatus 500 shown in FIG. 5 includes one or more of central processing units (CPU) or digital processors, such as a microprocessor, digital signal processor, field-programmable gate array, RISC core, or plurality of processing components mounted on one or more substrates. The processing subsystem is coupled to non-transitory computer-readable storage media such as memory 504, which may include for example SRAM, FLASH, SDRAM, and/or mass storage (e.g., HDD (Hard Disk Drive)) 507 components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

The processing subsystem may also include additional co-processors. As shown, the processing subsystem 502 includes discrete components; however, it is understood that in some embodiments they may be consolidated or fashioned in a SoC (system-on-chip) configuration.

The apparatus 500 further includes wireline and/or wireless interfaces 506, 509 which are configured to receive/send transmissions from/to the EPC host and DSS entity 600, respectively (discussed below with respect to FIG. 6), the latter embodied in one case in extant base station apparatus; these transmissions include for example resource allocation requests and connection request responses.

In one exemplary embodiment, the non-transitory computer-readable storage media includes instructions which when executed by the processor, implement the SME functionality described above with respect to FIG. 4 (i.e., white space/resource identification and allocation), as well as supporting the necessary communication and signaling protocols.

In the illustrated LTE-based implementation, the SME apparatus 500 is configured to terminate the base station (e.g., eNodeB) dynamic spectrum sharing (DSS) measurement, control, and signaling protocols at the evolved packet core (EPC) on the control plane, as discussed in greater detail below with respect to FIGS. 6 and 7.

Exemplary Dynamic Spectrum Sharing (DSS) Apparatus—

Figure 6:
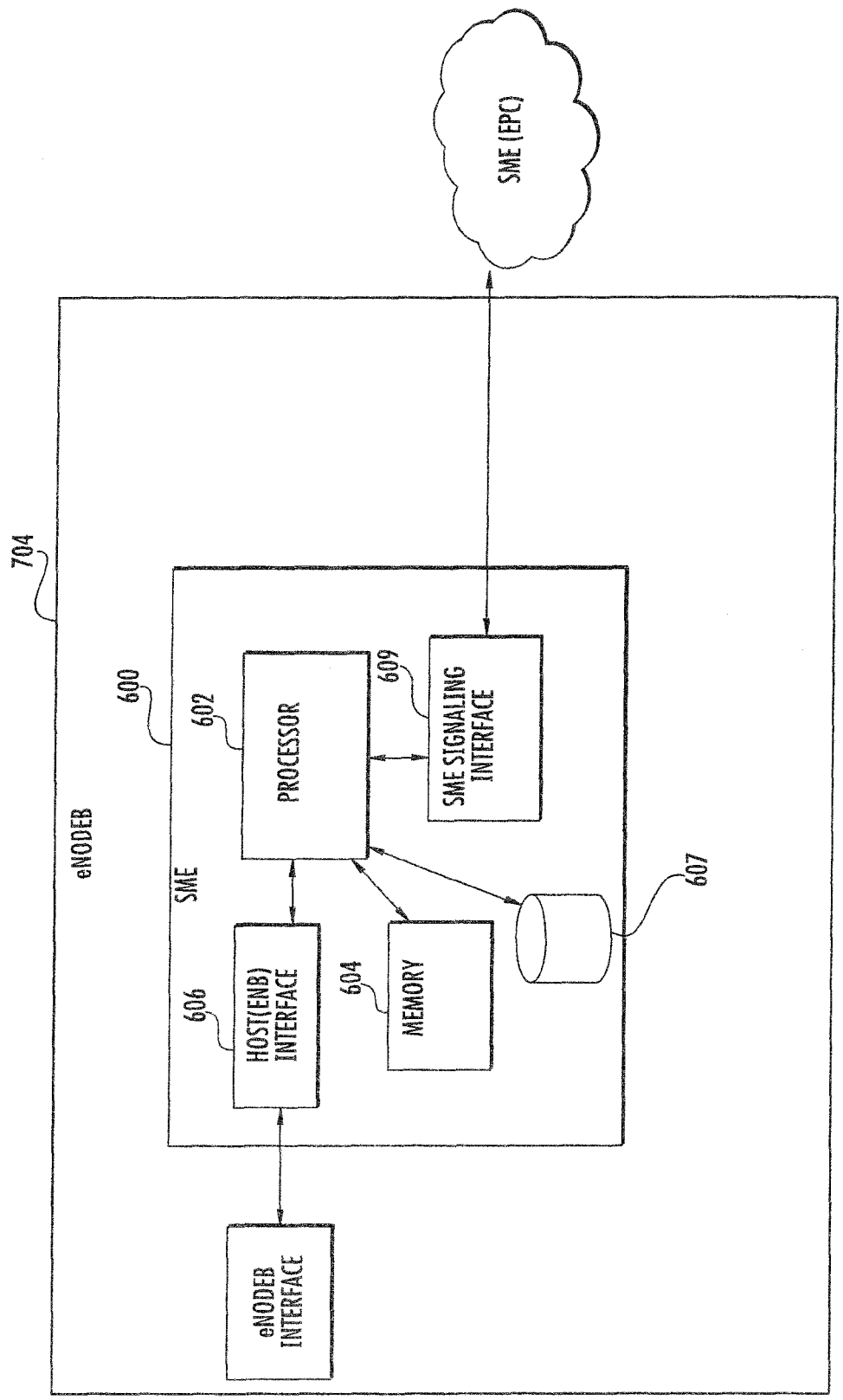
FIG. 6 is a functional block diagram of one embodiment of an exemplary Dynamic Spectrum Sharing (DSS) apparatus according to the invention.

Referring now to FIG. 6, an exemplary implementation of the DSS apparatus 600 which provides, inter alia, measurement, signaling, and control functions as described above is shown and described. In this embodiment, the DSS 600 is implemented on one or more eNodeB base stations 704 (FIG. 7) configured to communicate with the SME 500 disposed on the EPC server 702 discussed supra, such as to provide resource reservation requests. As used herein, the term "base station" may include any sort of radio frequency-enabled computerized device and can be implemented as a stand-alone entity, or within another device or entity, and may include for instance a macrocell, microcell, femtocell, picocell, wireless access point, or any combinations of the foregoing. While a specific device configuration and layout is shown and discussed, it is recognized that many other configurations may be readily implemented by one of ordinary skill given the present disclosure, the apparatus 600 of FIG. 6 being merely illustrative of the broader principles of the invention. As noted above for the SME, the DSS entity may comprise, inter alia, a stand-alone form factor, a card-like form factor, or be fully integrated with extant host device (e.g., eNodeB) hardware and/or software.

The DSS processing subsystem 602 shown in FIG. 6 includes one or more of central processing units (CPU) or digital processors, such as a microprocessor, digital signal processor, field-programmable gate array, RISC core, or plurality of processing components mounted on one or more substrates. The processing subsystem is coupled to non-transitory computer-readable storage media such as memory 604, which may include for example SRAM, FLASH, SDRAM, and/or mass storage (e.g., HDD (Hard Disk Drive)) 607 components. The processing subsystem may also include additional co-processors. As shown, the processing subsystem 602 includes discrete components; however, it is again understood that in some embodiments they may be consolidated or fashioned in a SoC (system-on-chip) configuration.

The DSS apparatus 600 further includes one or more wireline/wireless interfaces 606, 609 which are configured to receive/send transmissions and signaling from/to the host eNodeB and SME, respectively.

In one exemplary embodiment, the non-transitory computer-readable storage media includes instructions which when executed by the processor, implement the DSS functionality described elsewhere herein.

As noted above, the illustrated LTE-based implementation uses the DSS to terminate the SME/EPC measurement, control, and signaling protocols at the eNodeB, as discussed in greater detail below with respect to FIG. 7.

Example Implementation and Operation—

Figure 7:
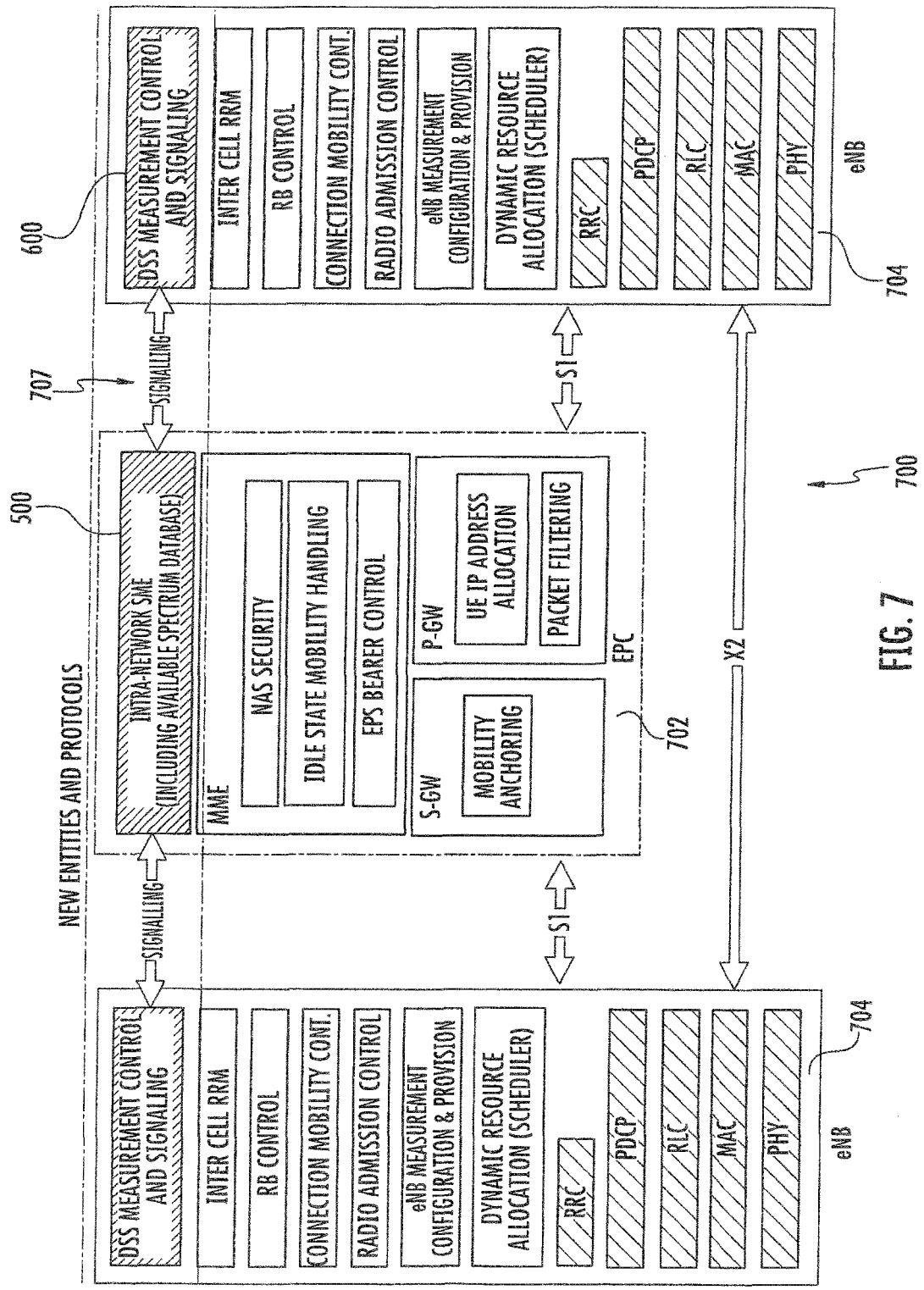
FIG. 7 is a graphical representation of one embodiment of a protocol and signaling architecture between the SME and DSS entities, in the exemplary context of a 3GPP E-UTRAN and EPC.

Referring now to FIG. 7, an exemplary logical network architecture 700 (based on 3GPP Evolved Packet Core (EPC), and modified according to one exemplary implementation of the present invention) is shown and described. As illustrated, the Spectrum Management Entity (SME) 500 and DSS MCS 600 entities are located in the packet core network 702 and the eNodeB(s) 704, respectively. Since the inclusion of this functionality requires new control signals and messages over the extant standard interfaces, the existing interfaces S1, X2 and the network entities eNodeB 704 and EPC 702 are in one implementation modified relative to their legacy counterparts in order to support the resource sharing functionality described herein. It will be appreciated by those of ordinary skill that the functionality disclosed herein can be used in conjunction with other technologies, such as e.g., a 3GPP UMTS/HSPA radio access network and the associated core network.

As shown in FIG. 7, the DSS MCS entity 600 in each eNodeB 704 is responsible for spectrum usage measurement and reporting, requesting additional spectrum, as well as assignment and release of the additional spectrum when not in use.

Figure 8:
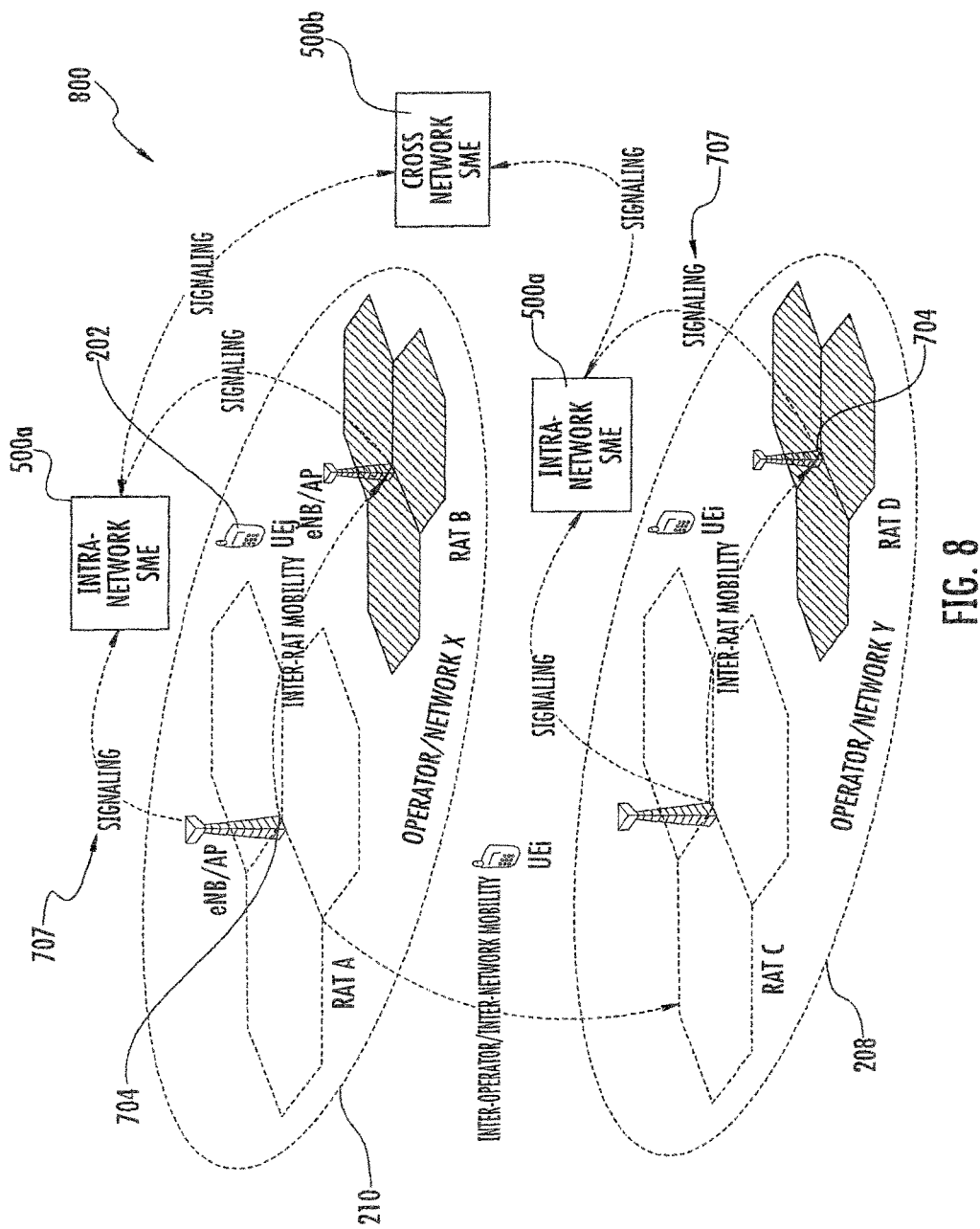
FIG. 8 is a graphical representation of one embodiment of a network architecture including an intra-network SME, cross-network SME, and associated signaling, according to the invention.
Figure 9:
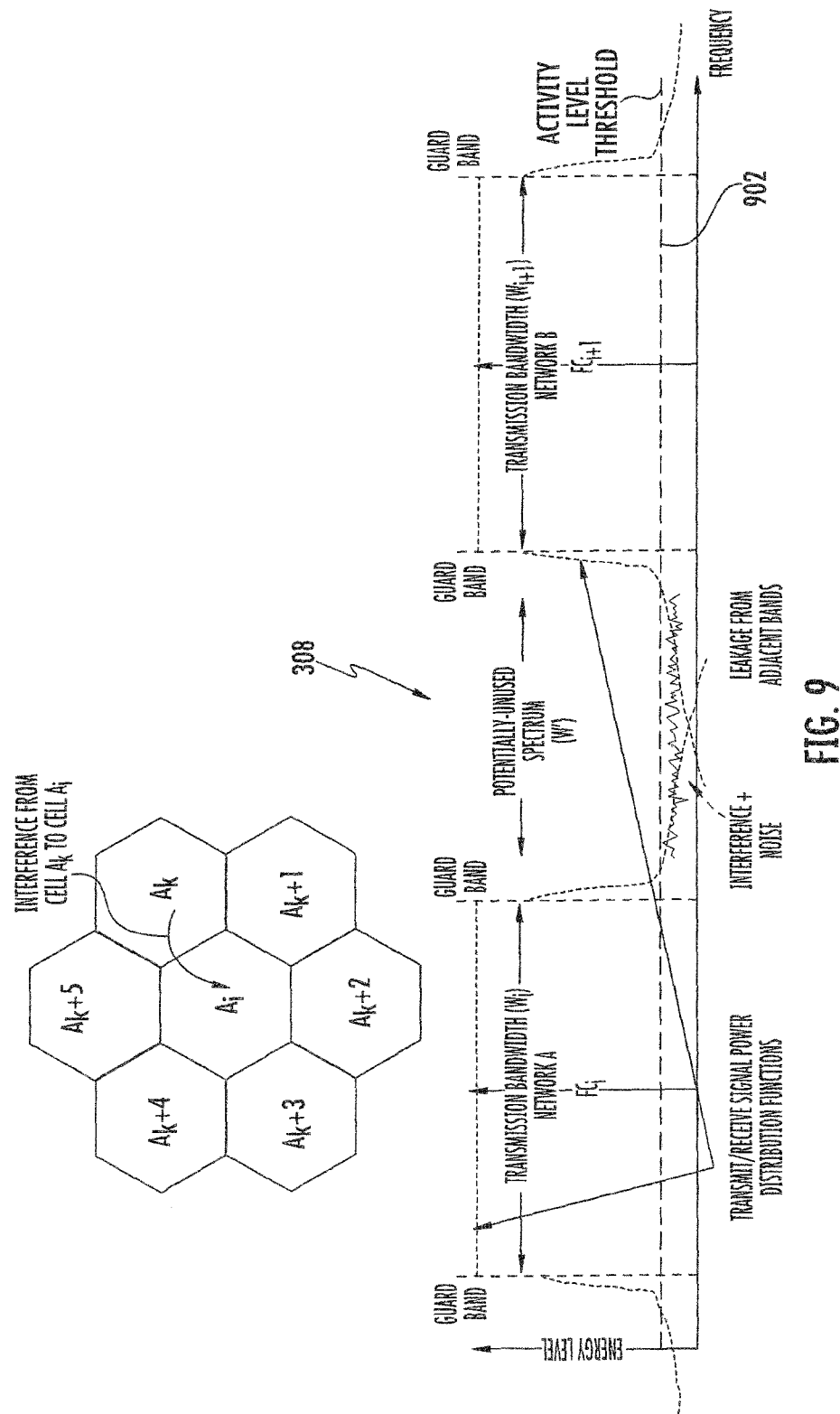
FIG. 9 is a graphical representation of an exemplary adjacent channel leakage and channel activity level determination according to one embodiment of the invention.

An example network architecture incorporating one or more SMEs 500 and DSC MCS entities 600 of the type previously described is shown in FIG. 8 herein. The Figure shows hypothetical Multi-RAT networks owned by two operators that are generally geographically co-located. A user terminal may roam in and out of the coverage of these networks based on the movement pattern of the user; thus, it will encounter intra-RAT/inter-RAT and/or intra-network/inter-network mobility situations that, when combined with dynamic spectrum sharing and spectrum mobility, may become cumbersome. As used in the present context, the term "spectrum mobility" refers generally to a process wherein a cognitive-radio-enabled user device 102, 112, 202, 212 changes its frequency of operation as the user terminal moves from one geographical area to another, or from the coverage area of one cell to another. Cognitive radio networks target the use the spectrum in a dynamic manner by allowing the radio terminals to operate in the "best" (aka optimal, based on one or more operational or other considerations) available frequency band, maintaining seamless communication requirements during the transition to better spectrum.

As shown in FIG. 8, the exemplary implementation may include two separate SME functional units 500 in the networks. An intra-network SME 500a manages and controls spectrum sharing within an operator's network between two or more different RATs, and a cross-network SME 500b functional unit may perform spectrum sharing functions across two or more operators' networks. There are protocol signaling paths between: (i) eNBs and intra-network SMEs (see signaling paths 707 in FIG. 7), and (ii) intra-network SMEs and cross-network SMEs 804. The intra-network SMEs 500a may be used for instance at small geographical areas, whereas cross-network SMEs 505b may be utilized at very large geographical regions. It is assumed that in the exemplary network architecture shown in FIG. 8, eNodeB's 704 or Access Points (APs) are responsible for spectrum availability sensing and measurements, as well as periodic reporting of the measurements to the SMEs 500a, 500b, although it will be appreciated that other arrangements are possible consistent with the invention as previously described.

Figure 10:
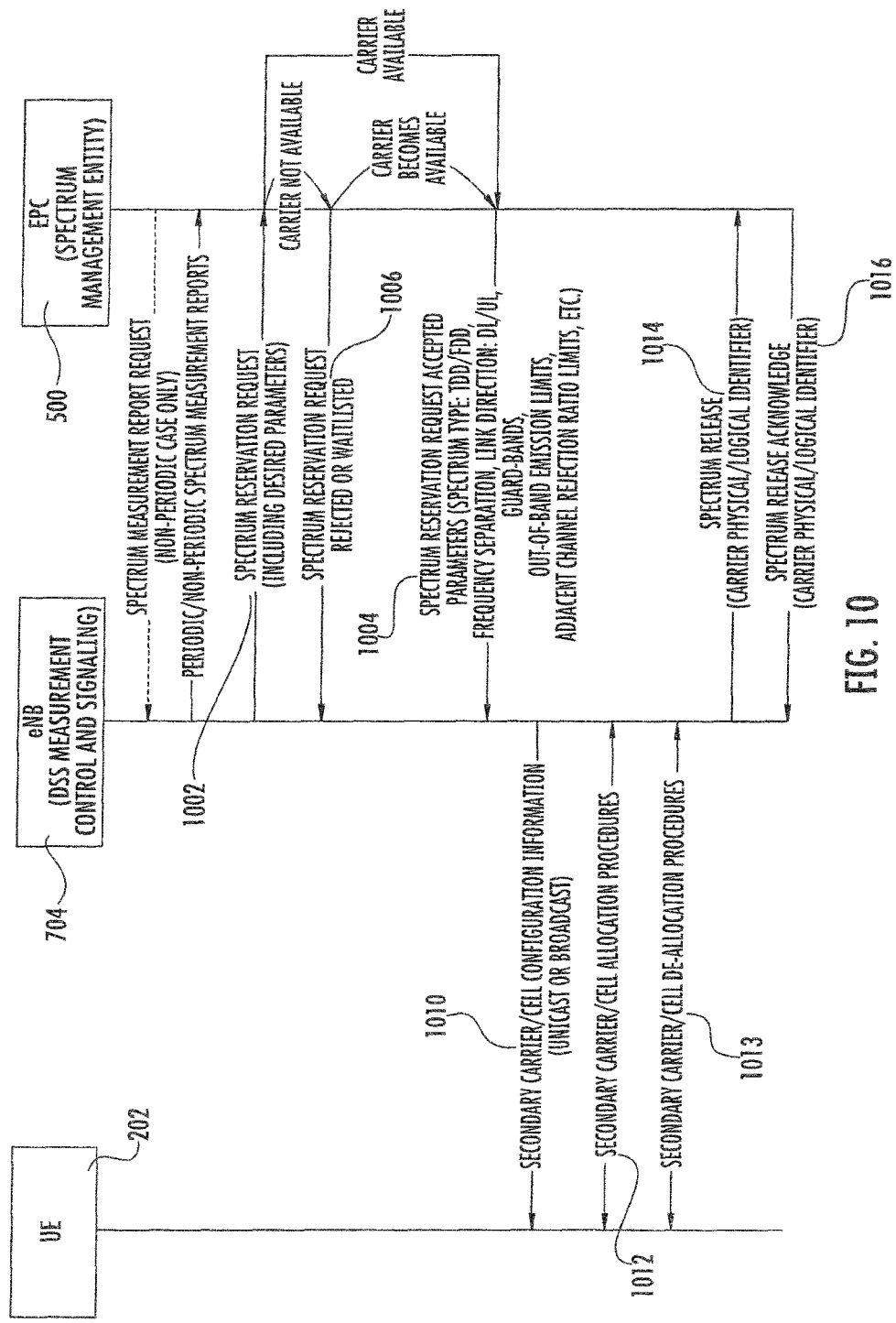
FIG. 10 is a graphical representation of one particular implementation of a spectrum reservation, allocation, and de-allocation procedure according to the invention.

As a brief aside, extant multi-carrier schemes generally designate one RF carrier as the primary RF carrier or primary cell (PCell), and zero or more RF carriers as secondary RF carriers or secondary cells (SCells). The secondary RF carriers can be fully or partially configured, and assigned to mobile devices (e.g., UEs) depending on the UE's capability and other operational considerations. However, it will be appreciated that there is a significant distinction between the exemplary implementations of the present invention and such existing multi-carrier operation. Specifically, in the latter (extant) implementation, the RF carriers are permanently available at the eNodeB, to be used or assigned as active carriers to different mobile stations or user terminals. In contrast, the exemplary implementations of the present invention are not required to permanently assign the additionally-available RF carriers (secondary carriers) to the base stations or the network, and such RF carriers are only made available based on the implemented scheme (e.g., reservation request from the base station or the network, as discussed supra with respect to FIG. 4). FIG. 10 (discussed in greater detail infra) depicts one exemplary signaling procedure for dynamically requesting, assigning, and releasing of additional RF carriers to multi-carrier enabled base stations or networks according to the invention.

Determination of Spectrum Availability—

Intrinsic in the methodology of the invention (including the exemplary method 400 of FIG. 4 described above) is the ability to identify and designate a frequency band or other resource as "white space" (that is, unused). In order to make this designation, one exemplary embodiment of the invention calculates, over a certain period of time (referred to as "non-occupancy period" or NOP), the energy over the frequency band of interest, such as at periodic intervals, and compares this value with for instance an adaptive threshold 902 (see FIG. 9). In this exemplary implementation, the energy is calculated as the sum of (i) the signal; (ii) the noise; and (iii) any interference present, although it will be appreciated that other methods of calculating energy (and in fact other metrics that are not energy per se) may be used consistent with the invention. The spectrum occupancy is in one embodiment measured in a prescribed geographical area (referred to as a "measurement cell"), which is in one implementation at least partly co-extensive with the coverage area of an eNodeB or AP of interest. In one variant, the measurements are repeated at periodic intervals (referred to as "measurement intervals"), and compared to an adaptive threshold.

An exemplary criterion for spectrum occupancy is that, if the activity level is below the prescribed threshold 902 during the specified NOP, then the spectrum is considered unused; otherwise, the spectrum is being used.

Sample Calculation—

Let $S_i(f,t_j) \forall t_j \in \{T_m\}, f_{c_i} - W_i/2 < f < f_{c_i} + W_i/2$, $f_{c_i}$ and $W_i$ denote the power spectral density function of the signal transmitted/received in channel $C_i$ sampled at time instant $t_j$, the center frequency of the channel, and the channel bandwidth, respectively. The instantaneous Adjacent Channel Leakage Ratio (ACLR) is defined as:

$$\eta_i(t_j) = \frac{\int_{f_{c_i}+f_0}^{f_{c_i}+f_0+W'} S_i(f, t_j) df}{\int_{f_{c_i}-W_i/2}^{f_{c_i}+W_i/2} S_i(f, t_j) df} \qquad \text{Eqn. (1)}$$

where W' and $f_0$ denote the bandwidth the potentially-unused channel over which the measurements are conducted, and an offset from the center frequency of channel $C_i$ (i.e., to account for the guard bands), respectively. If $P_i(t_j)$ denotes the denominator of the above equation (the instantaneous transmit/receive signal energy over channel $C_i$), then the channel will be considered unoccupied if the instantaneous energy samples over the non-occupancy period (NOP) $T_{non-occupancy}$ are less than an adaptive and configurable threshold $\zeta$; i.e.:

$$\varepsilon(t_j) = \sum_i \eta_i(t_j) P_i(t_j) + N_0(t_j) + I_0(t_j) < \zeta \forall t_j \in \{T_m\} \qquad \text{Eqn. (2)}$$

where $N_0(t_j)$ and $I_0(t_j)$ represent the noise and inter-cell/intra-cell interference power sample at time $t_j$, respectively.

Subsequently, the channel considered unoccupied, and the SME 500a, 500b shall consider the vacant channel to be assigned to another system or operator that has a pending request for additional spectrum.

It will be appreciated that the noise floor (spurious signals, noise and interference) in the shared channel would reduce the maximum signal-to-interference plus noise ratio (SINR) that can be achieved in a given frequency band. Thus, the threshold $\zeta$ should be chosen such that the operational SINR limits for the radio access technology or the wireless network that would be assigned to and operated in that band are satisfactory.

Moreover, while the foregoing sample calculation utilizes an adaptive threshold as an identification or acceptance criterion, other criteria may be used in conjunction with or in place of the aforementioned threshold. For example, in one variant, the stability or lack of variation of the sensed energy signature over time is used for determining the presence or absence of spectral use (i.e., based on the assumption that a substantially constant or low-variability spectral signature is indicative of no users, but rather of a substantially constant interference source and/or noise).

Exemplary Reservation and Release Procedure for New Channels—

Referring now to FIG. 10, an exemplary reservation and release procedure according to the invention is shown and described in detail. While illustrated in the context of the LTE-based infrastructure of FIGS. 7 and 8 herein, it will be appreciated that the following procedure is readily adapted to other technologies and network configurations by those of ordinary skill when given the present disclosure.

As illustrated in FIG. 10, the eNodeB 704 sends a request for reservation of a new RF carrier to the Spectrum Management Entity (SME) 500 at step 1002. In this example embodiment, the SME is located in the EPC 702, and the signaling between the eNodeB 704 and EPC is conducted over the extant S1 interface, although other interfaces may be used for this purpose. The spectrum reservation request message may contain for example the number of RF carriers, preferred duplex scheme (TDD/FDD), etc.

Note that in addition to regulatory limitations, single spectral bands or two spectral bands not sufficiently apart in frequency may not support FDD operation. If the SME 500 can assign one or more RF carriers to the requesting eNodeB, it sends (per step 1004) an acknowledgement message containing in one implementation the parameters of the assigned RF carrier(s) including but not limited to: (i) spectrum type (TDD/FDD), (ii) frequency separation of the downlink and uplink bands (in the case of FDD), (iii) link direction of each band, (iv) the required guard-bands configuration, (v) out-of-band (OOB) emission limits, and (vi) permissible Adjacent Channel Rejection Ratio (ACRR), to the requesting eNodeB.

Otherwise, if the spectrum is intended for use by other eNodeBs, the spectrum reservation request is either rejected or wait-listed, and a signal is sent to notify the requesting eNodeB of this decision (step 1006). If the request is rejected, the eNodeB sends another reservation request in the case that it still requires additional spectrum (or secondary RF carriers). If the earlier request is wait-listed, the requesting eNodeB is not required to send a new request, and waits until the spectrum becomes available. In that case, the SME 500 notifies the requesting eNodeB using the same reservation acknowledgement message as described earlier.

Once the eNodeB receives the reservation request acknowledgement, it sends unicast or broadcast messages notifying the multi-carrier enabled UEs 202 of the availability of the new secondary RF carriers per step 1010. Note that the assignment of the new RF carrier by the intra-network SME 500a/cross-network SME 500b is temporary, and the RE carrier is released by eNodeB once it is no longer in use.

Following the unicast or broadcast advertisement of the available new RF carrier, the eNodeB can initiate secondary RF carrier setup procedures with selected multi-carrier capable UEs, and make control and traffic allocations on the new secondary carrier(s) in the same way that permanent primary and secondary RE carriers are allocated and used today (step 1012). Note that the dynamic reservation and release 1014 of the additional RE carriers are transparent to the UEs 202, and take place between the eNodeBs and SMEs. Note also that each RF carrier has, in the exemplary implementation, a unique identifier that includes information about center frequency, bandwidth, masking and OOB requirements, etc.

When the secondary RF carrier is no longer used or adequately loaded, the eNodeB releases the secondary RF carrier(s) by first performing the de-allocation of the secondary RF carrier(s) procedures per step 1013 with all UEs configured to use those secondary RF carriers, and then sending a spectrum release message to the SME (step 1014) containing the identity of the RF carriers being released. The intra-network/cross-network SME 500a/500b sends an acknowledge message confirming the release of the RE carrier(s) and their identities per step 1016. The released RF carriers are no longer used by the eNodeB which has released them, unless they are reassigned later following the same request and assignment procedures.

Although not shown in FIG. 10, the intra-network/cross-network SME 500a/500b can in one implementation utilize cognitive radio techniques to examine the usage of the temporarily assigned spectral bands (e.g., using channel sensing techniques), and request for release of the spectral bands that are not efficiently or effectively utilized. In that case, the secondary carrier(s) release procedures may be triggered by a release request message from the intra-network/cross-network SME to the eNodeB 704.

As previously noted, the dynamic spectrum sharing concept using cognitive radio techniques, as well as the procedures for detection and assignment of unoccupied frequency bands described in this disclosure may be readily modified by those skilled in the art and applied to various radio access technologies. Moreover, the location and implementation of the intra-network/cross-network SMEs 500a/500b may vary depending on the radio access technology to which the scheme is applied.

Exemplary implementations of the invention also make use of software defined radio (SDR) and reconfigurable RF and/or baseband processing in the eNodeB 704 and UE 202, since both have no a priori knowledge of the RF bands that may be assigned to the eNodeB, and thus they are required to automatically configure/reconfigure their RF circuitry when the temporary secondary RF carrier(s) are allocated or de-allocated.

It will also be appreciated that other use cases of the invention exist, such as for example in the form of dynamic sharing of the RF spectrum or other resources by the intra-network/cross-network SMEs 500a/500b among a number of base stations supporting different radio access technologies (RATs), after accounting for possible coexistence issues related to assigning different bands to such different radio access technologies.

Moreover, while the foregoing embodiments are described in the context of licensed spectrum, it will be appreciated that the unused available spectrum (white spaces) of the invention can be either licensed or unlicensed (or a mixture of both). The intra-network/cross-network SMEs 500a/500b in one implementation are configured to distinguish between licensed and unlicensed RF bands, and provision and assign the bands to radio access systems taking this attribute into consideration (e.g., by allocating licensed spectrum to cellular systems, and unlicensed spectrum to unlicensed systems such as Wi-Fi).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An integrated circuit in a first cell, comprising:
   circuitry to communicate using a first radio frequency ("RF") carrier, wherein the first RF carrier is in a licensed spectrum band;
   circuitry to request a reservation of resources in the unlicensed spectrum band from a Spectrum Management Entity ("SME");
   circuitry to receive an indication of one or more resources in an unlicensed spectrum from the SME, wherein when the one or more resources in the unlicensed spectrum are intended for use by a further cell prior to being allocated to the first cell, the indication including data that notifies the first cell that the first cell is wait-listed by the SME for the one or more resources in the unlicensed spectrum;
   circuitry to identify at least one unused resource from the one or more resources in the unlicensed spectrum;
   circuitry to coordinate carrier aggregation with a second cell based on the indication of one or more resources, wherein the second cell uses a RF carrier in the unlicensed spectrum band;
   circuitry to generate for transmission a first signal on the licensed spectrum band; and
   circuitry to generate for transmission an indication of termination of use of the one or more resources in the unlicensed spectrum band.

2. The integrated circuit of claim 1, wherein the unlicensed spectrum band is inaccessible by the first RF carrier.

3. The integrated circuit of claim 1, further comprising:
   circuitry to generate for transmission an indication of a selection of the at least one unused resource to the SME.

4. The integrated circuit of claim 1, wherein the first cell is a primary cell ("PCell") or a secondary cell ("SCell").

5. The integrated circuit of claim 1, wherein the second cell is a SCell.

6. A base station, comprising:
   a processor; and
   computerized logic in signal communication with the processor, the computerized logic configured to:
   communicate using a first radio frequency ("RF") carrier, wherein the first RF carrier is in a licensed spectrum band;
   request a reservation of resources in the unlicensed spectrum band from a Spectrum Management Entity ("SME");
   receive an indication of one or more resources in an unlicensed spectrum from the SME, wherein when the one or more resources in the unlicensed spectrum are intended for use by a further cell prior to being allocated to the base station, the indication including data that notifies the base station that the base station is wait-listed by the SME for the one or more resources in the unlicensed spectrum;

identify at least one unused resource from the one or more resources in the unlicensed spectrum;

coordinate carrier aggregation with a first cell based on the indication of one or more resources, wherein the first cell uses a RF carrier in the unlicensed spectrum band;

transmit, via the transmitter, a first signal on the licensed spectrum band; and transmit, via the transmitter, an indication of termination of use of the one or more resources in the unlicensed spectrum band.

7. The base station of claim 6, wherein the unlicensed spectrum band is inaccessible by the first RF carrier.

8. The base station of claim 6, wherein the computerized logic is further configured to:

transmit, via the transmitter, an indication of a selection of the at least one unused resource to the SME.

9. The base station of claim 6, wherein the first cell is a secondary cell ("SCell").

10. A method in a first cell, comprising:

communicating using a first radio frequency ("RF") carrier, wherein the first RF carrier is in a licensed spectrum band;

requesting a reservation of resources in the unlicensed spectrum band from a Spectrum Management Entity ("SME");

receiving an indication of one or more resources in an unlicensed spectrum from the SME, wherein when the one or more resources in the unlicensed spectrum are intended for use by a further cell prior to being allocated to the first cell, the indication including data that notifies the first cell that the first cell is wait-listed by the SME for the one or more resources in the unlicensed spectrum;

identifying at least one unused resource from the one or more resources in the unlicensed spectrum;

coordinating carrier aggregation with a second cell based on the indication of one or more resources, wherein the second cell uses a RF carrier in the unlicensed spectrum band;

transmitting a first signal on the licensed spectrum band; and transmitting an indication of termination of use of the one or more resources in the unlicensed spectrum band.

11. The method of claim 10, wherein the unlicensed spectrum band is inaccessible by the first RF carrier.

12. The method of claim 10, further comprising:

transmitting an indication of a selection of the at least one unused resource to the SME.

13. The method of claim 10, wherein the first cell is a primary cell ("PCell") or a secondary cell ("SCell").

14. The method of claim 10, wherein the second cell is a SCell.

* * * * *